INVENTOR.
Heinz Ulffers

United States Patent Office 2,810,321
Patented Oct. 22, 1957

2,810,321

PROJECTION HIGH PRESSURE ARC LAMP DEVICES

Heinz Ulffers, Kiel-Wik, Germany, assignor to Zeiss Ikon A. G., Stuttgart, Germany Application January 14, 1955, Serial No. 481,942

6 Claims. (Cl. 88—24)

The invention relates to improvements in arc lamps for picture projectors.

It is customary to provide projector arc lamps employing a high pressure gas discharge lamp as a light source with an auxiliary reflector which permits utilization of at least a part of the light portion which is not caught by the main reflector and the condenser, respectively. This auxiliary reflector must be adjusted so that the reflected image of the arc is accurately brought into coincidence with the arc. If this is not done, a certain amount of light is lost. Moreover, the life of the gas discharge lamp may be impaired if the picture of the arc formed by the auxiliary reflector partly falls upon the electrodes.

It is known, when controlling the crater position in carbon arc lamps, to make use of so-called crater reflectors by means of which it is possible to observe the position of the tips of the carbon rods which, when their feeding mechanism is not operating completely uniformly, under certain conditions may be considerably displaced in direction of the optical axis. Migration or displacement of the arc in axial direction of the lamp does not occur in gas discharge lamps. In this type of lamp, however, both the position of the arc and the position of its reflected image are, as explained above, of importance.

It is, therefore, an object of the present invention to provide an improved high pressure gas discharge lamp for projector arc lamps by selecting the projective arrangement of the optical system thereof so that the observation of the arc together with its reflected image is possible essentially in direction of the optical axis.

It is a further object of the invention to utilize a portion of the main reflector in place of an additional optical element for the reflection of the arc. In connection with a mirror swingable into the projection beam, the picture of the arc together with its reflected image is projected in the desired direction.

Figure 1:
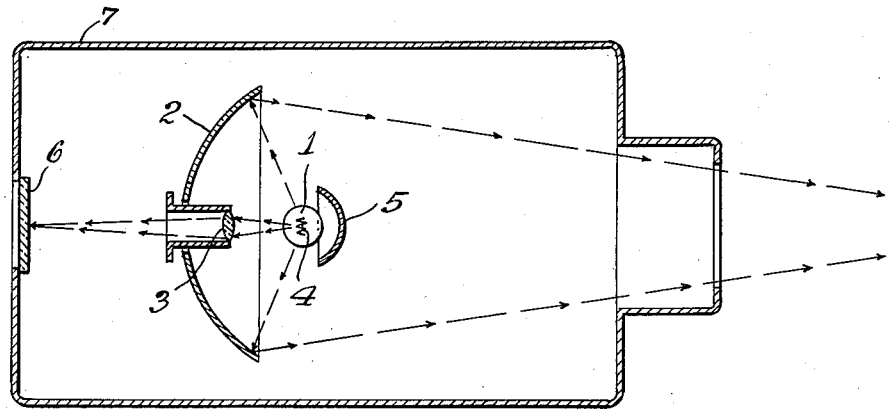
Figure 2:
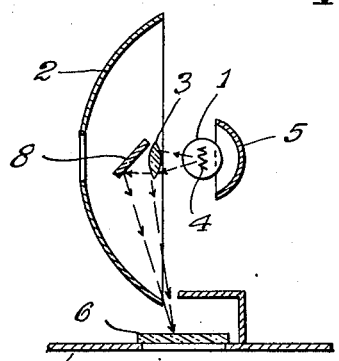
Figure 3:
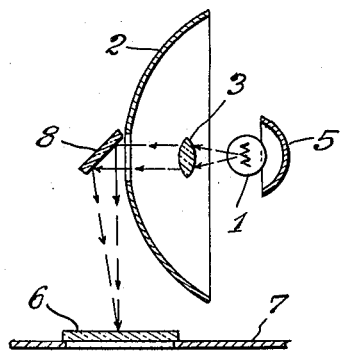
Figure 4:
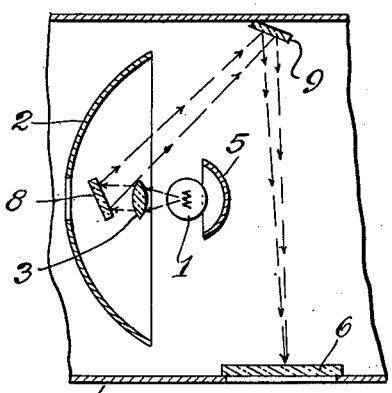
Figure 5:
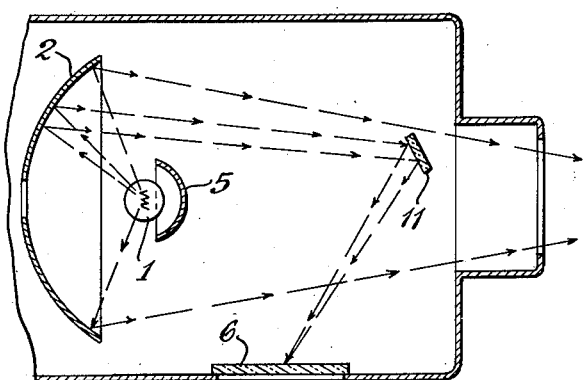

The present invention will now be described with reference to the accompanying drawings illustrating, by way of example, several embodiments of the invention, and in which:

Fig. 1 is a diagrammatic plan view of a projection arc lamp having a high pressure gas discharge lamp and an optical system according to the invention, Figs. 2 and 3 show schematically a reflective mirror disposed before and behind the main reflector, respectively, Fig. 4 is a diagrammatic view of an arrangement wherein a second reflective mirror is used, and Fig. 5 shows an arrangement in which the main reflector serves as a projective element.

Referring to Fig. 1, a lens 3 is arranged between the high pressure gas discharge lamp 1 and the main reflector 2. The lens 3 projects an image of the arc 4 on a ground glass plate 6 arranged in the rear wall of the lamp housing 7. The lens 3 projects also an image of the arc formed by the auxiliary reflector 5 which image should coincide with the arc 4 on the ground glass plate 6. The auxiliary reflector 5 is adjusted by a positioning device, shown in Fig. 6 of the drawing, so that the image can be brought into coincidence with the other arc image. In principle, a small aperture according to a pin hole camera may be employed in place of the lens 3. However, the use of a lens is preferable, since due to its small depth of focus it permits of an easier adjustment of the auxiliary reflector in the direction of the optical axis.

In order to make it easier for the motion-picture operator, who as a rule stands at the side of the projector, to observe and to adjust the auxiliary reflector, it is possible according to the invention to project the image on a ground glass plate 6, which is arranged in the side wall 7 of the lamp housing by means of an additional reflecting mirror 8, as illustrated in the embodiments shown in Figs. 2 to 5. According to Fig. 2, the reflecting mirror 8 may be arranged in front of the main reflector 2, or according to Fig. 3 in the rear of the main reflector 2. A cover plate 10 (Fig. 2) protects the ground glass plate 6 against any disturbing side-light coming from the gas discharge lamp 1.

According to Fig. 4, the light path can be increased by the use of a second reflecting mirror 9 arranged on the opposite wall of the lamp housing in order to obtain a greater enlargement of the image of the arc. In the arrangement, as shown in Fig. 5, the main reflector 2 serves as a projecting element. In order to project the image of the arc on the focusing screen 6, which is situated in a side wall of the lamp housing, there may be used a mirror 11, which is turned into the beam of the main reflector 2 and which deflects the rays emanating from the main deflector 2 to the ground glass plate 6 where an image is produced of both the arc 4 and of the image produced by the auxiliary reflector 5. In this arrangement, the lens 3 can be dispensed with. The reflecting mirror 11, however, since it deflects the illuminating path of rays must be turned into the path of the rays in order to adjust the arc 4 and as well the auxiliary reflector 5 of said arc.

All the above arrangements can be used at the same time in order to control the position of the gas discharge lamp, particularly during its exchange with a mechanical alternating device. In this case it is only necessary either to mark the position of the lamp on the ground glass plate or, if the rear reflector was correctly adjusted with reference to the old lamp, the new lamp has to be adjusted in such a manner so that the arc and its image come into coincidence again.

Instead of projecting the arc and its image on a ground glass plate, the image of the arc may also be projected to a place outside the lamp housing—e. g. onto the wall of the projection room.

What I claim is:

1. In a projection high pressure arc lamp device for a picture projector, a lamp housing having a projection opening and having mounted therein a high pressure gas discharge lamp, a main concave reflector in the rear of said gas discharge lamp and an auxiliary concave reflector arranged in front of said gas discharge lamp with the focal centers of said reflectors coincident with the arc of said high pressure gas discharge lamp, a focusing screen in a wall of said lamp housing, means for projecting an image of the arc of said gas discharge lamp onto said focusing screen in a direction other than the direction of light projected through said projection opening, said means being also adapted to project an image of said arc as produced by said auxiliary reflector in coincidence upon the image of the arc on said focusing screen and means for adjusting said auxiliary reflector.

2. In a projection high pressure arc lamp device for a picture projector, a lamp housing having a projection opening and having mounted therein a high pressure gas discharge lamp, a main concave reflector in the rear of said gas discharge lamp and an auxiliary concave reflector arranged in front of said gas discharge lamp with the focal centers of said reflectors coincident with the arc of said high pressure gas discharge lamp, a focusing screen in a wall of said lamp housing, means for projecting an image of the arc of said gas discharge lamp onto said focusing screen in a direction other than the direction of light projected through said projection opening, said means being also adapted to project an image of said arc as produced by said auxiliary reflector in coincidence upon the image of the arc on said focusing screen.

3. In a projection high pressure arc lamp device for a picture projector, a lamp housing having a projection opening and having mounted therein a high pressure gas discharge lamp, a main concave reflector in the rear of said gas discharge lamp and an auxiliary concave reflector arranged in front of said gas discharge lamp with the focal centers of said reflectors coincident with the arc of said high pressure gas discharge lamp, a ground glass plate in the rear wall of said lamp housing, a projection lens arranged in the optical axis between said gas discharge lamp and said ground glass plate for projecting an image of the arc of said gas discharge lamp onto said ground glass plate in a direction opposite to the direction of light projection through said projection opening, and means for adjusting said auxiliary reflector to a position in which it reflects an image of said arc onto the image of the arc appearing on said ground glass plate.

4. In a projection high pressure arc lamp device for a picture projector, a lamp housing having a projection opening and having mounted therein a high pressure gas discharge lamp, a main concave reflector in the rear of said gas discharge lamp and an auxiliary concave reflector arranged in front of said gas discharge lamp with the focal centers of said reflectors coincident with the arc of said high pressure gas discharge lamp, a ground glass plate in a side wall of said lamp housing, and optical means arranged in the optical axis between said gas discharge lamp and said ground glass plate for projecting an image of the arc of said gas discharge lamp through a central aperture in said main reflector onto said ground glass plate in a direction opposite to the direction of projected light through said projection opening, said optical means being also adapted to project an image of said arc by means of said auxiliary reflector onto said ground glass plate.

5. In a projection high pressure arc lamp device for a picture projector, a lamp housing having a projection opening and having mounted therein a high pressure gas discharge lamp, a main concave reflector in the rear of said gas discharge lamp and an auxiliary concave reflector arranged in front of said gas discharge lamp with the focal centers of said reflectors coincident with the arc of said high pressure gas discharge lamp, a ground glass plate in a side wall of said lamp housing, and optical means arranged in the optical axis between said gas discharge lamp and said ground glass plate for projecting an image of the arc of said gas discharge lamp through a central aperture in said main reflector onto said ground glass plate in a direction opposite to the direction of projected light through said projection opening, said optical means being also adapted to project an image of said arc by means of said auxiliary reflector onto said ground glass plate and means for adjusting said auxiliary reflector to project the image of the arc into coincidence with the image of the arc directly projected onto said ground glass screen.

6. In a projection high pressure arc lamp device for a picture projector, a lamp housing having a projection opening and having mounted therein a high pressure gas discharge lamp, a main concave reflector in the rear of said gas discharge lamp and an auxiliary concave reflector arranged in front of said gas discharge lamp with the focal centers of said reflectors coincident with the arc of said high pressure gas discharge lamp, a ground glass plate in a side wall of said lamp housing, and optical means arranged in the optical axis between said gas discharge lamp and said ground glass plate for projecting an image of the arc of said gas discharge lamp in a direction other than the direction of light projected through said projection opening onto said ground glass plate, said optical means being also adapted to project an image of said arc by means of said auxiliary reflector onto said ground glass plate.

References Cited in the file of this patent

UNITED STATES PATENTS

| Number | Name | Date |
|---|---|---|
| 445,379 | Peral | Jan. 27, 1891 |
| 735,760 | Hanks | Aug. 11, 1903 |
| 908,560 | Goodrich | Jan. 5, 1909 |
| 961,114 | Forster | June 14, 1910 |
| 996,647 | Jacobson | July 4, 1911 |
| 1,163,192 | Adams | Dec. 7, 1915 |
| 1,213,974 | Taylor | Jan. 30, 1917 |
| 1,563,510 | McCarthy | Dec. 1, 1925 |
| 1,701,626 | McCarthy | Feb. 12, 1929 |
| 1,705,356 | Bohner | Mar. 12, 1929 |
| 1,763,630 | Hopkins | June 10, 1930 |
| 1,860,943 | Moulton | May 31, 1932 |
| 2,117,737 | May | May 17, 1938 |
| 2,190,294 | Mili | Feb. 13, 1940 |
| 2,192,886 | Bergmans et al. | Mar. 12, 1940 |
| 2,319,489 | Carlson | May 18, 1943 |